April 12, 1966 H. F. RIEHLE 3,245,678
TOOL HOLDER
Filed Aug. 6, 1963
2 Sheets-Sheet 2
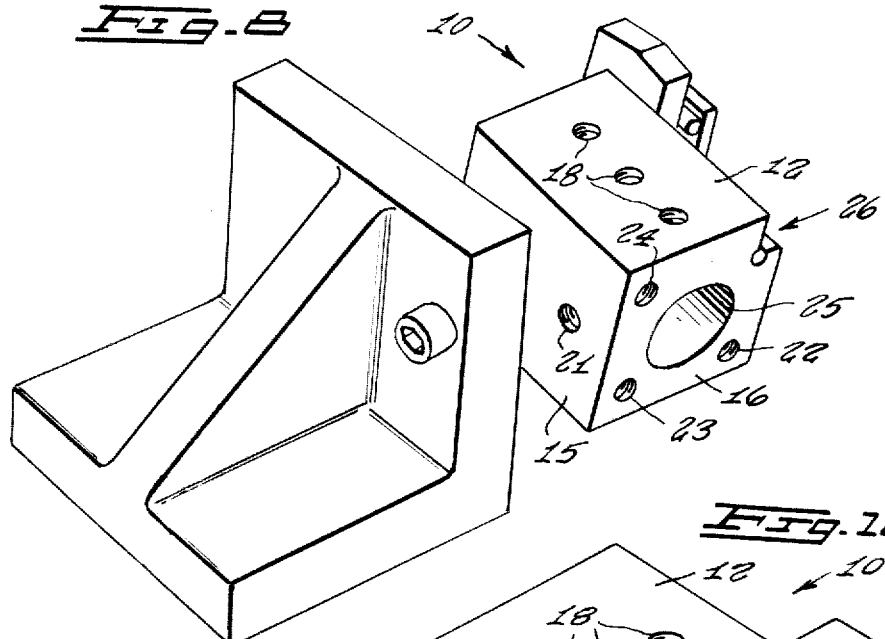
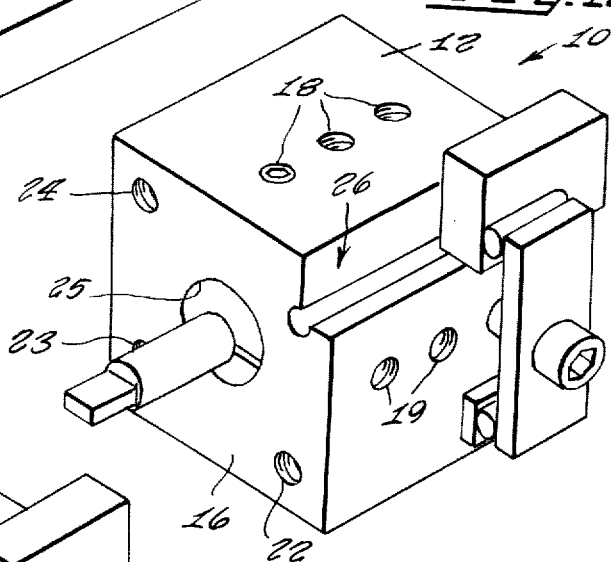
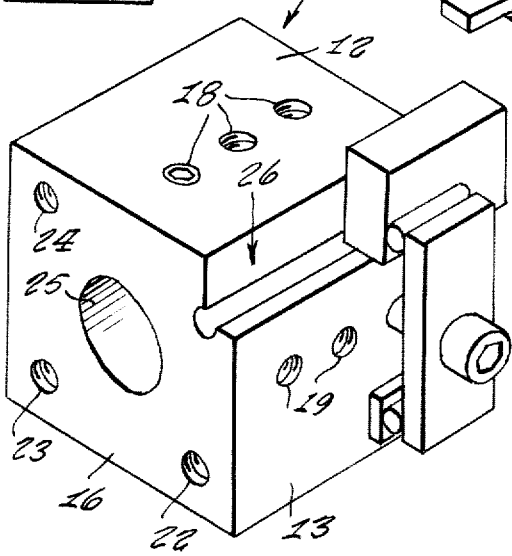
INVENTOR
BY Hank Riehle

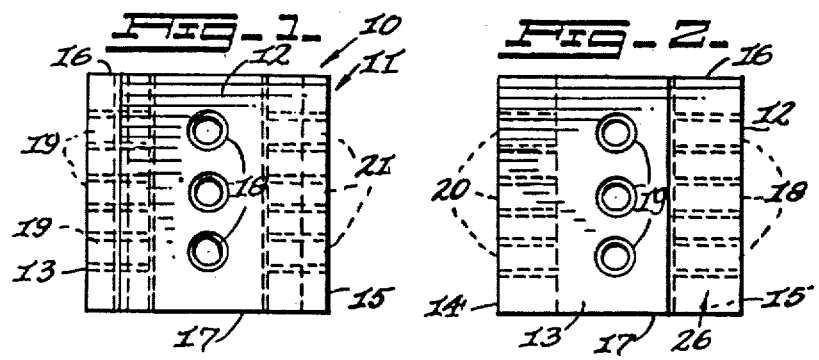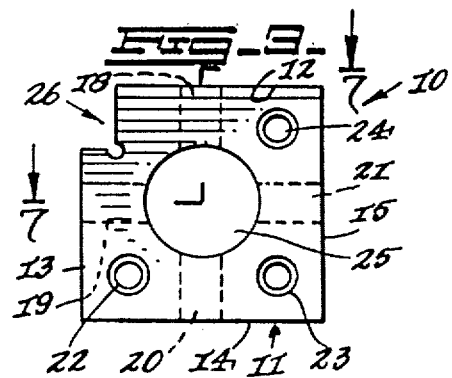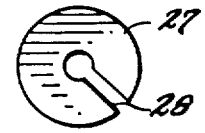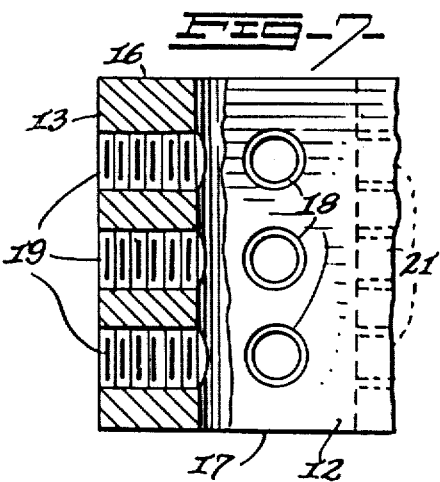
INVENTOR.
BY Hans H. Riehle

United States Patent Office 3,245,678
Patented Apr. 12, 1966

3,245,678
TOOL HOLDER
Hank F. Riehle, Rte. 1, Box 203X, Fort Smith, Ark.
Filed Aug. 6, 1963, Ser. No. 300,346
4 Claims. (Cl. 269—315)

The present invention relates to tools and more particularly to a tool holding device for grinding of various work pieces. The primary object of this invention is to provide a holder for grinding small work pieces with two or more surfaces perpendicular to each other. Also the holder in question may be used to grind round shank work pieces such as a punch with a square or rectangular piercing end, also the holder may be used in conjunction with an angle plate and sine bar to grind precision angles of a work piece.

One object of this invention is to provide a tool of the class described which may be inexpensive to manufacture and easy to utilize in the machine shop.

Another object of this invention is to provide a tool made of hardened steel, rectangular in shape and which may be provided upon its various flat surfaces with a plurality of threaded (tapped) holes.

A further object of this invention is to provide a square steel hardened block which may have at least one or more notches cut upon its flat surfaces.

An additional object of this invention is to provide a hardened steel block having six flat surfaces, with each one of its surfaces being provided with at least one or more tapped holes.

A further object of this invention is to provide a holding device having six perfectly flat surfaces, two of which are square in shape with the edges bounding these two surfaces being of the exact same length with a precision ground hole through the geometric center of these two surfaces, the remaining four surfaces being either square or rectangular in shape.

Another object of this invention is to provide a holding device having six perfectly flat surfaces with each one of its surfaces being provided with at least one or more tapped holes. This invention also consists in certain other features of construction and the combination and arrangement of parts to be hereinafter fully described, illustrated in the accompanying drawings and specifically pointed out in the appended claims.

This invention also consists in certain other features of construction, and the combination and arrangement of parts, to be hereinafter fully described, illustrated in the accompanying drawings, and specifically pointed out in the appended claims.

In describing the invention in detail, references will be made to the accompanying drawings, where like character numerals denote like or corresponding parts throughout the several views, in which:

FIG. 1 is a top elevational view of the present invention;

FIG. 2 is a side elevational view of FIG. 1;

FIG. 3 is a rear elevational view of FIG. 1;

FIG. 4 shows the plug;

FIG. 5 is a side elevational view of the clamp;

FIG. 6 is a bottom view of FIG. 5; and

FIG. 7 is an enlarged sectional view taken on the line 7—7 of FIG. 3.

It is to be understood that the present form of disclosure is merely for the purpose of illustration, and that there might be various modifications thereof, without departing from the spirit of the invention as herein set forth.

Referring now more particularly to the hardened steel block 10, best seen in FIG. 1, made in accordance with the present invention, it comprises, in combination, the steel body 11 of the block with its six flat surfaces numbered 12, 13, 14, 15, 16 and 17, inclusive. Each of the rectangular flat surfaces 12, 13, 14 and 15, may be provided with one or more tapped holes 18, 19, 20 and 21, respectively; while the remaining two rectangular surfaces, 16 and 17, may be provided with one or more tapped holes 22, 23 and 24, respectively, and a large diameter precision ground hole 25.

From FIGS. 1 and 3, it is clear that the large diameter hole 25 passes clear across the entire width of the block (from the square surface 16 to the square surface 17), also the precision ground hole 25 is in the exact geometric center of surfaces 16 and 17.

Reference now being had to FIG. 3, it can be seen that a rectangular notch 26 is cut in the block 11. Each surface of the notch 26 is perpendicular to its adjoining surfaces 12 and 13 as shown, the purpose of the notch 26 being to facilitate holding of a work piece in conjunction with the clamp shown in FIGURE 5 so that it may be ground or machined. While only one notch is shown, it is understood that additional notches may be provided in the block 10 when desirable.

FIG. 4 shows a circular plug 27 which may be utilized in connection with the precision ground hole 25, in the event it is necessary to decrease the diameter of the hole. The plug 27 is provided with a cut-out 28 to facilitate the insertion of the plug into the hole 25. With the outside diameter of the plug 27 being slightly larger than the diameter of the hole 25, the slot or the cut-out 28 permits a perfectly tight fit, while the inside diameter of the plug 27 may be varied in size to allow insertion of different sized work pieces.

It is now recognized that in its use, in the machine shop, the square tool 10 may find many useful applications. Especially attractive is the fact that many small and otherwise difficult to hold work pieces may be held securely and accurately while performing many machine operations on them. Also by holding the work piece in the holding device while making various set ups highly accurately, results may be achieved since the work piece is never moved but the block 10 is moved instead.

A careful examination of the foregoing description in conjunction with the invention as illustrated in the drawings, will enable the reader to obtain a clear understanding and impression of the alleged features of merit and novelty, sufficient to clarify the construction of the invention as hereinafter claimed.

Minor changes in shape, size and materials, and rearrangement of parts, may be resorted to in actual practice, as long as no departure is made from the invention claimed.

Having described my invention, what I claim is the following:

1. A holding device of class described, comprising, in combination a block having six flat rectangular surfaces, at least three tapped holes provided in four out of six surfaces in the holder, with the other two remaining surfaces having three tapped holes each and a clearance hole, said clearance hole passing entirely across the entire width of said block, and a notch in said holder, said notch disposed parallel and spaced from the clearance hole in said holder.

2. The combination according to claim 1, each of the four surfaces having three tapped holes each facing each other, with the holes in two opposite surfaces being in perfect alignment, each of said tapped holes ending in said clearance hole.

3. The combination according to claim 1, the tapped holes in the remaining two surfaces running parallel with said clearance hole.

4. The combination according to claim 1, said notch being disposed in said tool parallel with said three tapped holes in the remaining two surfaces and parallel to said clearance hole in said block.

References Cited by the Examiner
UNITED STATES PATENTS

| | | | |
|---|---|---|---|
| 2,409,936 | 10/1946 | Hunt | 77—63 |
| 2,536,629 | 1/1951 | DeSousa | 51—220 |
| 2,756,508 | 7/1956 | O'Grady et al. | 33—174 |

WILLIAM W. DYER, Jr., *Primary Examiner.*

ROBERT C. RIORDON, *Examiner.*

W. D. BRAY, *Assistant Examiner.*